Figure 1:
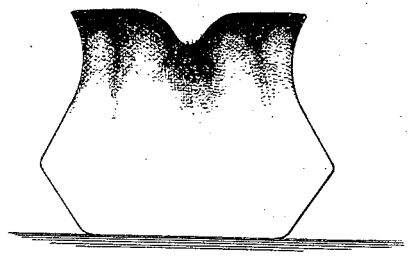

(Specimens.)

J. LOCKE.
ORNAMENTAL GLASSWARE.

No. 345,436. Patented July 13, 1886.

Witnesses.
John F. C. Prindlert
Fred L. Emery.

Inventor
Joseph Locke
by Crosby Gregory attys.

UNITED STATES PATENT OFFICE.

JOSEPH LOCKE, OF MEDFORD, ASSIGNOR TO EDWARD D. LIBBEY, OF BOSTON, MASSACHUSETTS.

ORNAMENTAL GLASSWARE.

SPECIFICATION forming part of Letters Patent No. 345,436, dated July 13, 1886.

Application filed April 13, 1886. Serial No. 198,676. (Specimens.)

*To all whom it may concern:*

Be it known that I, JOSEPH LOCKE, of Medford, county of Middlesex, and State of Massachusetts, have invented an Improvement in Ornamental Glassware, of which the following description, in connection with the accompanying drawings, is a specification, like letters on the drawings representing like parts.

This invention has for its object the production of a novel and beautiful article of glassware.

My improved glassware is composed of two different kinds of glass, one plated on the other, the body of the article being composed of any well-known opal-glass mixture, and a ruby-glass mixture containing gold, such as is also well known, the same being combined in about equal parts, and the plating being of the ruby-glass mixture containing gold, the completed article showing at portions thereof, both externally and internally, a developed color due to the presence of the gold and brought out by reheating.

My novel glassware may be made to present two different colors based on a red, and it is possible to give to the open end or mouth of the article two different shades based on a red color, each color blending into the different colors maintained in the body of glass homogeneous with it, the developed colors in the two different kinds of glass, one plated upon the other, modifying each other when subjected to light, as is well understood when a translucent or semi-opaque body of one color is laid upon a translucent body of a different shade or color.

In the practice of my invention, I gather from a pot upon an iron—such as is commonly used in the manufacture of glass—a body of glass composed of the combination of the opal-glass mixture and the ruby mixture containing the metal gold, and upon this I gather, or plate, from another pot, another body of glass formed from said ruby mixture containing gold, both being well known to skilled glass-makers, and from these two kinds of glass, so gathered or plated one on the other, the article to be produced is blown and formed in the usual manner. The article having been formed is then cooled in the atmosphere, or by other well-known means, and reheated at the "glory-hole" or "pot-hole" at those parts where it is desired to develop colors differing from and blending into the original or natural color of the glass as first gathered from the pots, as stated. The open end or mouth, or such other portions of the article which it is desired to color, as stated, will, after partially cooling, be subjected to heat, which causes a change in color to take place in or through the presence of the metal gold, and the result is an article of glassware of party-color, or showing colors blended into each other with beautiful and pleasing effect. The article having for its inside a glass composed of the above-described combination of opal and gold ruby, and having for its outside plating a transparent glass consisting of a ruby compound containing gold, will, by cooling and reheating such portions as are desired to have developed colors, not only present a developed color, or shade of color, red, on the outside, but also the inner opaque side will have the developed color, or shade of color, pink, which colors, in combination and dependent upon each other, produce or present a beautiful and artistic effect, while the portions that are not reheated will retain the shades of color characterizing the glass before reheating.

Figure 2:

Figure 1 shows an article of glassware embodying my invention, and Fig. 2 a section thereof on an enlarged scale.

The opal body is marked *a*, the plated body is marked *b*.

In the drawings the shading shows the developed color.

The original color of the opal-glass mixture may be variously modified by the addition of different oxides, the particular color depending upon the oxide used, as is well known to those skilled in the art of glass-making.

I claim—

As an improved article of manufacture, glassware having a body composed of the combination of an opal-glass mixture and a ruby-glass mixture containing gold plated with a body made from a ruby-glass mixture containing gold, each having different colors produced by reheating, which in combination produce party-colors blending into each other, substantially as described.

In testimony whereof I have signed my name to this specification in the presence of two subscribing witnesses.

JOSEPH LOCKE.

Witnesses:
G. W. GREGORY,
F. CUTTER.